United States Patent [19]

De Boer et al.

[11] Patent Number: 4,941,368
[45] Date of Patent: Jul. 17, 1990

[54] STOP SCREW WITH DROP-IN BALL

[75] Inventors: Johannes De Boer, Madenhausen; Manfred Tröster, Bad Kissingen, both of Fed. Rep. of Germany

[73] Assignee: FAG Kugelfischer Georg Schafer (KGaA), Fed. Rep. of Germany

[21] Appl. No.: 300,471

[22] Filed: Jan. 23, 1989

[30] Foreign Application Priority Data

Mar. 12, 1988 [DE] Fed. Rep. of Germany ....... 3808375

[51] Int. Cl.$^5$ .............................................. G05B 5/06
[52] U.S. Cl. ......................................... 74/527; 74/475; 74/477
[58] Field of Search ...................... 74/527, 477, 475 X; 464/35–38; 192/110 R, 4 C; 16/24–26 X

[56] References Cited

U.S. PATENT DOCUMENTS

| 3,016,759 | 1/1962 | Fletcher | 74/475 |
| 3,725,990 | 4/1973 | Petersen et al. | 29/157.1 |
| 3,866,488 | 2/1975 | Nakata et al. | 74/477 X |
| 4,229,993 | 10/1980 | Andresen | 74/475 X |
| 4,275,613 | 6/1981 | Worner et al. | 74/527 X |
| 4,377,951 | 3/1983 | Magg et al. | 74/477 |
| 4,467,665 | 8/1984 | Katayama et al. | 192/4 C X |
| 4,519,266 | 5/1985 | Reinecke | 74/475 X |
| 4,539,859 | 9/1985 | Arai et al. | 74/475 |

FOREIGN PATENT DOCUMENTS 8713965.0 1/1988 Fed. Rep. of Germany.

OTHER PUBLICATIONS

Star Company Brochure No. 036/1/86/3, Kugelrollen mit Stahlblechgeghause und Kunststofflaufkugel 0531-(KU-D) p. 6 Published in 1976.

Primary Examiner—Vinh T. Luong
Attorney, Agent, or Firm—Ostrolenk, Faber, Gerb & Soffen

[57] ABSTRACT

A stop screw with drop-in ball comprises a drop-in ball supporting body which holds the drop-in ball at the top axial end of the body, and support balls for the drop-in ball in the top end. An inner cup like part of deep drawn sheet metal has an open top end at which the drop-in ball is disposed. A hollow screw-housing surrounds the inner part. The inner part has a widened diameter region toward the ball and the axial end of the screw housing engages the widening region of the inner. A radially inwardly directed collar at the top end of the inner part projects inwardly toward the drop-in ball and holds the support balls in the top end. A spring in the inner part presses the ball supporting body through the top of the inner part.

5 Claims, 1 Drawing Sheet

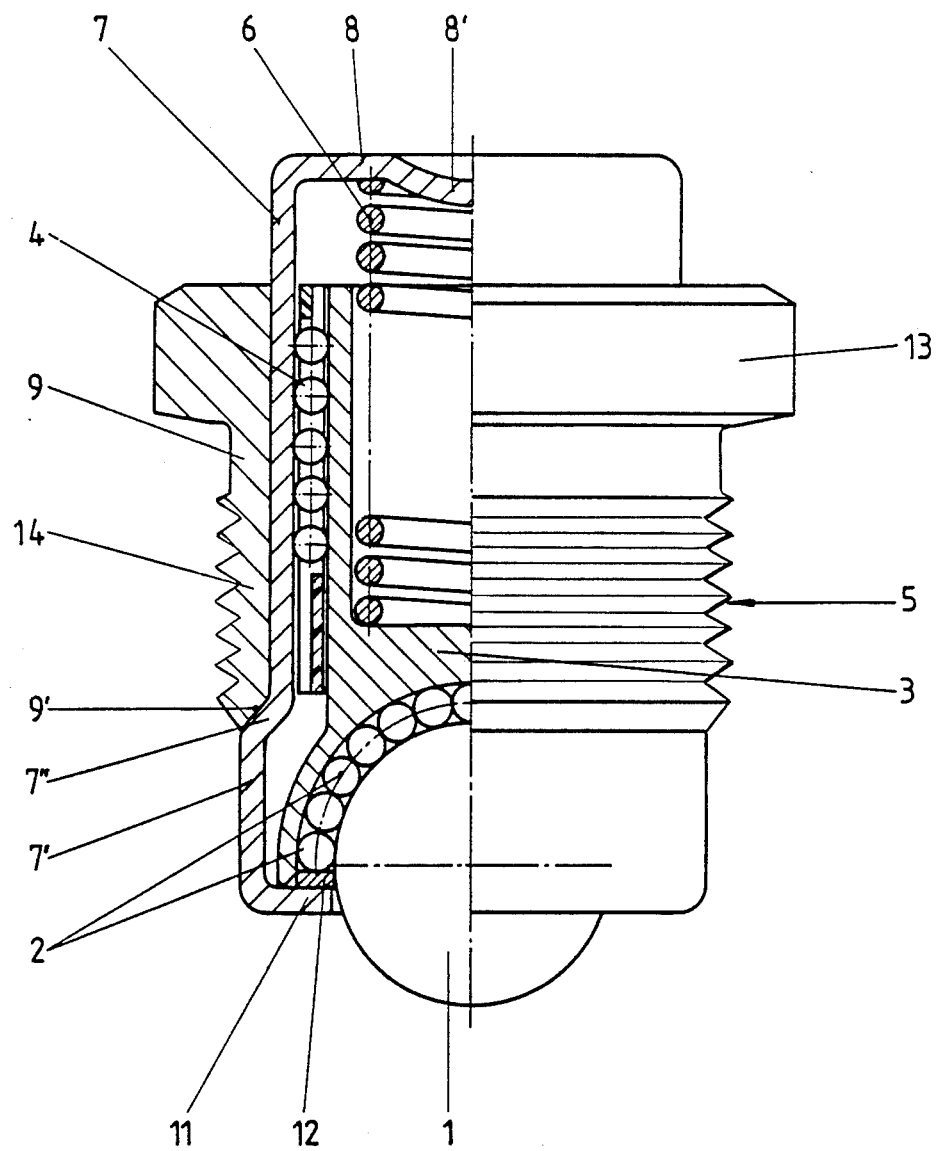

STOP SCREW WITH DROP-IN BALL

BACKGROUND OF THE INVENTION

The invention refers to a stop screw with a drop-in ball that is acted upon by a spring.

Stop screws of this type are used, for instance, for gearshift lever shafts of automobile transmissions. Such stop screws are known, for instance, from Federal Republic of Germany Model No. 8,713,965. In that case, the outer screw housing is a solid part. It must have a complicated shape in order to cooperate with the inner parts. The manufacture of this turnable part is therefore expensive. For example, an external thread and a wrench profile must be provided on the outside of the housing, while bearing surfaces which are as smooth as possible, and in particular hardened, must be produced on the inside to retain the mobility of the drop-in ball. Series manufacture, in particular, is made difficult.

SUMMARY OF THE INVENTION

The object of the present invention is to improve a stop screw to avoid the above-mentioned disadvantages and, in particular, to provide a screw housing, which is simple to manufacture but nevertheless functions well.

According to the invention, the screw housing comprises two parts. There is a generally cuplike inner part, for example, drawn from sheet metal, and having a closed bottom and an open top in which the drop-in ball is installed. The inner part can be produced with sufficient accuracy and at little expense as a hardened part, using customary methods. A simple, commercially available, hollow screw, which is provided with an external thread and external wrench profile is then fastened over the inner part. Despite the multiplicity of parts, considerable advantages in manufacture are obtained as compared with the solid screw of the prior art, particularly if it is borne in mind that these parts are required in very large number.

In accordance with a preferred embodiment, the inner part is provided with a section of widened diameter in the axial region of the drop-in ball. This widened shape can be easily produced by deep drawing. The development is, on the one hand, more compact while, on the other hand, the hollow screw is fixed here by the axial striking of the thread-screw front end against the rear end of the widened section of the inner part. In this way, the position of the entire stop screw within the housing is also precisely established in uniform manner.

In order that the parts contained within the screw housing do not drop out, an inwardly-directed holding collar is developed on the ball side end of the inner part. That collar engages behind the small size support balls for the drop-in ball and their support part. Such engagement may be either directly or indirectly via a holding disc. In addition to the closed bottom of the inner part, this measure produces a space which is sealed off well and within which the lubricant is also reliably retained.

For centering the coil spring for the ball, it is further advisable that the bottom of the cup like inner part have an inwardly arched central projection, the outside diameter of which corresponds approximately to the inside diameter of the coil spring. The coil spring is then held in the correct radial position by this projection.

BRIEF DESCRIPTION OF THE DRAWING

Other objects and features of the invention are explained with reference to the drawing which shows a partial cross section through a stop screw according to the invention.

DESCRIPTION OF THE PREFERRED EMBODIMENT

The drop-in ball 1 rests in this connection, via a plurality of smaller diameter support balls 2, in a hemispherical well in a solid support part 3. The part 3 is mounted for axial movement via a linear ball bearing 4 within a screw housing 5 and the part 3 is acted upon axially by a compression spring 6.

The screw housing 5 is not a complicated structural part. It is instead formed of an easily produced, deep drawn inner part 7 with a closed bottom 8 and of a commercially available hollow screw 9 fastened around the inner part 7.

In a favorable, space saving manner, the inner part 7 is provided with a section 7' of widened diameter section in the axial region of the drop-in ball 1 and below the screw 9. This has the advantage that on the beveled front side 7'' of the inner part 7, there can rest the similarly beveled front side 9' of the hollow screw 9. As a result, a reliable, precise association of the parts 7 and 9 with each other is obtained.

A holding collar 11 is developed on the ball side of the inner part 7. The collar is subsequently bent inward to engage behind and hold in the support balls 2 through the interposition of a holding disc 12, and the collar is also behind the support part 3. Since the holding disc 12 has a smaller inside diameter than the drop-in ball 1, the ball 1 is also held fast in the screw housing 5.

On the bottom 8 of the inner part 7, there is an inwardly arched projection 8' which radially holds the coil spring 6 since the outer diameter of the projection 8' corresponds approximately to the inside diameter of the coil spring 6.

The stop screw, which has been thus assembled as a structural unit, can then be fastened by grasping the external wrench profile in the region 13 and then via the external thread 14 of the hollow screw 9. The stop screw can be fastened into the housing of a machine which requires a stop device, such as change speed gears of motor vehicles.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A stop screw with a drop-in ball comprising:
   a screw supporting housing comprising a cup like inner part with a bottom end and an opposite first top end at which the drop-in ball is supported; the bottom end of the inner part includes receiving means for receiving a spring thereon; the inner part having a widened region of wider cross-section in the axial region thereof toward and at the drop-in ball; the widened region having a rear end where the widened region widens to the wider cross-section of the widened region;
   a ball supporting body disposed inside the cup like inner part, the body including a second top end toward the first top end of the inner part for receiving the drop-in ball;

a linear ball bearing between the ball supporting body and the inner part for enabling relative axial shifting;

a hollow screw housing attached to and extending around the inner part, the screw housing having an external screw thread for being screwed into means for receiving the thread in an object which holds the stop screw the screw housing further having an external profile region for being engaged by a screw tightening means, such that the profile region is engaged for moving the screw housing which tightens the external thread into the means for receiving the thread;

the screw housing having a front end which rests axially against the widened region of the inner part for being tightened thereagainst upon tightening of the external thread into the means for receiving the thread;

a coil spring between the ball supporting body and the receiving means at the bottom end of the inner part; the receiving means comprises an arched central projection shaped for the coil spring to fit therearound; the coil spring extending to the ball support body and the ball support body including means thereon for receiving the coil spring.

2. The stop screw of claim 1 further comprising an inwardly directed holding collar defined on the inner part at the drop-in ball.

3. The stop screw of claim 2, further comprising a plurality of support balls in the in the second top end of the ball supporting body; the support balls being of smaller size than the drop-in ball; and the drop-in ball being supported in the top end of the ball support body by the supporting balls.

4. The stop screw of claim 3, wherein the collar extends radially inwardly sufficiently to hold the support balls in the top end and prevents the support balls from moving outward past the drop-in ball and past the inner part.

5. The stop screw of claim 4, further comprising a holding disc disposed axially outward of the support balls for being engaged by the collar, and the collar holding the disc and the disc in turn holding the support balls.

* * * * *